United States Patent
Yonak et al.

(10) Patent No.: US 8,260,502 B2
(45) Date of Patent: Sep. 4, 2012

(54) OCCUPANT DETECTION AND IMAGING SYSTEM

(75) Inventors: Serdar H. Yonak, Ann Arbor, MI (US); Paul D. Schmalenberg, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 545 days.

(21) Appl. No.: 12/427,949

(22) Filed: Apr. 22, 2009

(65) Prior Publication Data

US 2010/0274449 A1    Oct. 28, 2010

(51) Int. Cl.
*B60R 22/00* (2006.01)
(52) U.S. Cl. .......................................... 701/45; 280/735
(58) Field of Classification Search ..................... 701/45, 701/47; 280/735
See application file for complete search history.

(56) References Cited

U.S. PATENT DOCUMENTS

| | | | |
|---|---|---|---|
| 5,528,698 A | 6/1996 | Kamei et al. | |
| 5,829,782 A | 11/1998 | Breed et al. | |
| 5,943,295 A | 8/1999 | Varga et al. | |
| 5,954,360 A * | 9/1999 | Griggs et al. | 280/735 |
| 6,007,095 A * | 12/1999 | Stanley | 280/735 |
| 6,014,602 A | 1/2000 | Kithil et al. | |
| 6,116,639 A | 9/2000 | Breed et al. | |
| 6,302,438 B1 * | 10/2001 | Stopper et al. | 280/735 |
| 6,474,683 B1 | 11/2002 | Breed et al. | |
| 6,792,342 B2 * | 9/2004 | Breed et al. | 701/45 |
| 8,016,319 B2 * | 9/2011 | Winkler et al. | 280/735 |

\* cited by examiner

*Primary Examiner* — Eric Culbreth
(74) *Attorney, Agent, or Firm* — Gifford, Krass, Sprinkle, Anderson & Citkowski, P.C.

(57) ABSTRACT

An active safety system for a machine and a process for operating the active safety system are disclosed. The active safety system an active ultrasonic array having a plurality of ultrasonic transducers. The plurality of ultrasonic transducers can propagate a plurality of sound waves, receive a plurality of echo waves and transform the plurality of echo waves into a plurality of electrical pulses. The plurality of electrical pulses can be transmitted to and received by a three-dimensional imaging circuit. The three-dimensional imaging circuit can generate a 3D image from the plurality of electrical pulses and an electrical control unit can determine a location, size and geometric orientation of the 3D image. The electronic control unit can also provide an occupant safety parameter as a function of the location, size and geometric orientation of the 3D image and transmit the occupant safety parameter or an instruction related to the occupant safety parameter to an occupant safety system and/or an occupant warning system.

11 Claims, 2 Drawing Sheets

OCCUPANT DETECTION AND IMAGING SYSTEM

FIELD OF THE INVENTION

The present invention relates generally to an occupant detection and imaging system. More specifically, the present invention relates to an active safety system for a machine that uses an occupant detection and imaging system in combination with an occupant safety system and/or an occupant warning system.

BACKGROUND OF THE INVENTION

Various safety systems are known to help protect and reduce injury of an occupant of a vehicle, an operator of a machine and the like. For example, seatbelts in combination with airbags are used within motor vehicles to prevent or help reduce serious injury of occupants riding therein. In addition, heavy equipment machinery can have an occupant warning system that alerts a driver of such a machine when an operator of the machinery has been placed in a potentially dangerous and/or unstable position.

The use of non-contact sensors to determine the location of an occupant with respect to an interior of a motor vehicle is also known. However, heretofore systems have been limited with respect to their ability to determine various safety parameter factors about the occupant. For example, heretofore systems have not determined whether or not an actual person is sitting in a seat of a motor vehicle and thus whether or not an airbag should be deployed in the event of a predefined impact to the vehicle. As such, an improved active safety system that would provide detailed location, size and geometric orientation of an occupant in the vehicle, an operator of a machine, etc., to an occupant safety system and/or an occupant warning system would be desirable.

SUMMARY OF THE INVENTION

A process for operating an active safety system of a machine is disclosed. The process can include providing a machine and an active ultrasonic array having a plurality of ultrasonic transducers. The plurality of ultrasonic transducers can be operable to propagate a plurality of sound waves, receive a plurality of echo waves and transform the plurality of echo waves into a plurality of electrical pulses. The active ultrasonic array can be operable to transmit the plurality of electrical pulses.

A three-dimensional (3D) imaging circuit can also be provided, the 3D imaging circuit being operable to receive the plurality of electrical pulses and generate a 3D image. Thereafter, an electrical control unit, which may or may not be part of the 3D imaging circuit can determine a location, size and geometric orientation of the 3D image and provide an occupant safety parameter as a function thereof. The active safety system can also include an occupant safety system that is operable to deploy an occupant safety device, and/or an occupant warning system that is operable to transmit an occupant warning signal, as a function of the occupant safety parameter.

The active ultrasonic array can be energized and afford for the propagation of the plurality of sound waves and the receiving of a plurality of echo waves, the plurality of echo waves resulting from the plurality of sound waves bouncing off of an occupant, object and the like. The plurality of echo waves can be transformed into a plurality of electrical pulses by the plurality of ultrasonic transducers and transmitted by the active ultrasonic array to the 3D imaging circuit. Upon receiving the plurality of electrical pulses, the 3D imaging circuit can generate the 3D image. The electronic control unit, which may or may not be part of the 3D imaging circuit, can then determine the location, size and geometric orientation of the 3D image relative to the machine. In some instances, the electronic control unit can determine whether or not an identified object is an occupant, i.e. a person, or a non-occupant object, e.g. a box.

After determining the location, size and geometric orientation of the 3D image, the electronic control unit can provide and/or calculate an occupant safety parameter as a function thereof. In addition, the electronic control unit can transmit the occupant safety parameter, or in the alternative an instruction that is related to the occupant safety parameter, to the occupant safety system and/or the occupant warning system. In this manner, the active safety system can determine whether or not to deploy the occupant safety device and/or transmit the occupant warning system as a function of the occupant safety parameter.

In some instances, the machine can be a motor vehicle and the active ultrasonic array can be attached to a headliner of the motor vehicle. The occupant safety parameter can be representative of a seat that is unoccupied, a seat that is occupied by an adult occupant, a seat that is occupied by a child occupant, a seatbelt that is fastened about an adult occupant, a seatbelt that is fastened about a child occupant, a seat that is occupied by a non-occupant object, an occupant facing forward in a seat, an occupant not facing forward in a seat, and the like.

The occupant safety system can be a smart airbag system with the active safety system affording whether or not an airbag is deployed when a predefined level impact to the motor vehicle occurs. Similarly, the occupant warning system can transmit a warning for an occupant to sit facing forward, to buckle a seatbelt, and the like, based on the occupant safety parameter. In some instances, the 3D imaging circuit can recognize a non-occupant object located on a seat and the active safety system can afford for the non-deployment of an airbag during a predefined level of impact to the motor vehicle when the seat is not occupied or a non-occupant object is recognized on the seat. Likewise, the active safety system can afford for the occupant warning system to not provide a warning to sit facing forward and/or to buckle a seatbelt when the seat is not occupied or a non-occupant object is recognized on the seat.

DETAILED DESCRIPTION OF THE INVENTION

Figure 1:
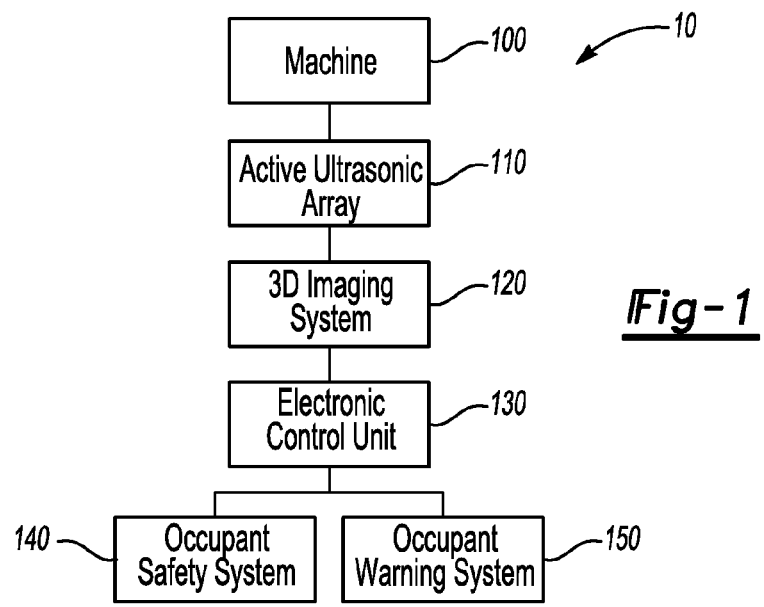
FIG. 1 is a schematic representation of an embodiment of the present invention.

The present invention discloses an active safety system for a machine and a process for operating the active safety system. As such, the active safety system and/or the process has utility for improving the safety of an occupant of a motor vehicle, an operator of a machine and the like.

The active safety system can include an active ultrasonic array that has a plurality of ultrasonic transducers. The plurality of ultrasonic transducers can propagate a plurality of sound waves, receive a plurality of echo waves resulting from the plurality of sound waves bouncing off a surface and transform the plurality of echo waves into a plurality of electrical pulses. In addition, the active ultrasonic array can transmit the plurality of electrical pulses to a three-dimensional (3D) imaging circuit. The 3D imaging circuit can receive the plurality of electrical pulses and generate a 3D image. An electronic control unit, that may or may not be part of the 3D imaging circuit, can determine a location, size and geometric orientation of the 3D image relative to the machine and provide an occupant safety parameter as a function thereof. In some instances, the electronic control unit can determine whether or not an identified object is an occupant, i.e. a person, or a non-occupant object, e.g. a box.

The occupant safety parameter can be any parameter known to those skilled in the art that provides information related to the safety of an occupant in a motor vehicle, an operator of a machine and the like. For example and for illustrative purposes only, the occupant safety parameter can be a parameter that provides information on: whether or not a seat in a motor vehicle or an operator station of a machine is occupied or unoccupied; whether a seat or operator station is occupied by an adult occupant; whether a seat or operator is occupied by a child occupant; whether a seatbelt is fastened about an adult occupant sitting in a seat; whether a seatbelt is fastened about a child occupant sitting in a seat; whether a seat is occupied by a non-occupant object; whether an occupant is facing forward while sitting in a seat, and combinations thereof. It is appreciated that such a parameter, for example a parameter that relates or describes a child sitting in a seat and/or a child that is located on the seat but not sitting and/or facing forward can be used by the active safety system to prevent injury to the child in the event that a motor vehicle that the child is riding in is involved in an accident.

The active safety system can include an occupant safety system that is operable to deploy an occupant safety device as a function of the occupant safety parameter. For example and for illustrative purposes only, the occupant safety system can be a smart airbag system within a motor vehicle and the occupant safety device can be an airbag. In addition, an occupant warning system can be provided that is operable to transmit an occupant warning signal as a function of the occupant safety parameter. Such an occupant warning signal can include a visual signal, an audio signal, a tactile signal and the like. For example, an occupant warning signal can include an audible voice instructing an occupant to fasten their seatbelt.

A process for operating the active safety system of the machine can include energizing the active ultrasonic array, propagating a plurality of sound waves by the plurality of ultrasonic transducers, and receiving of a corresponding plurality of echo waves by the plurality of ultrasonic transducers. The process can also entail transforming of the plurality of echo waves into a plurality of electrical pulses and transmitting the plurality of electrical pulses to the 3D imaging circuit.

The plurality of electrical pulses can be received by the 3D imaging circuit and used to generate a 3D image. The electronic control unit can then determine the location, size and geometric orientation of the 3D image relative to the physical barriers of the machine. It is appreciated that the term occupant, operator, etc. refers to an individual, person, etc., while the term non-occupant, non-operator, etc. refers to an object that is not a person.

The electronic control unit can provide, calculate, generate, etc. an occupant safety parameter as a function of the location, size and geometric orientation of the 3D image. Thereafter, the electronic control unit can transmit the occupant safety parameter to the occupant safety system and/or the occupant warning system. In the alternative, the electronic control unit transmits an instruction that is related to or is a function of the occupant safety parameter to the occupant safety system and/or the occupant warning system. In the event that the electronic control unit transmits the occupant safety parameter, it can be received by the occupant safety system and/or the occupant warning system and be used to determine whether or not to deploy the occupant safety device and/or transmit the occupant warning signal.

For example and for illustrative purposes only, a 3D image generated by the 3D imaging circuit as a result of receiving the plurality of electrical pulses by the active ultrasonic array can be determined by the electrical control unit to be that of a child sitting in a motor vehicle seat. In addition, since a child is determined to be sitting in the seat, the electronic control unit can provide an occupant safety parameter that would result in a smart airbag system not deploying an airbag in the event of a predefined level of impact to the motor vehicle. In the alternative, if an adult was determined to be sitting in a vehicle seat with a seatbelt properly attached, the active safety system could afford for an airbag not being deployed if the vehicle was subjected to a predefined low-level of impact.

It is appreciated that other situations or scenarios such as a seat not being occupied, a seatbelt not being fastened, a seat being occupied by an occupant but the occupant not facing forward, a seat occupied by a non-occupant object, and the like, can be imaged using the active ultrasonic array and the 3D imaging circuit. Thereafter, the image can be analyzed by the electronic control unit to provide an improved safety deployment system for one or more occupants within the vehicle.

Turning now to FIG. 1, an embodiment of an active safety system is shown generally at reference numeral 10. The active safety system 10 can include a machine 100 and an active ultrasonic array 110. In some instances, the active ultrasonic array can be located at least partially within the machine 100, or in the alternative, not be located within the machine 100 but be attached thereto. In other instances, the active ultrasonic array 110 is not attached to the machine 100 but is located proximate thereto such that a plurality of sound waves can be propagated in a direction towards an occupant within a vehicle, an operator of a machine and the like.

The system 10 can also include a 3D imaging system 120 and an electronic control unit 130. The electronic control unit 130 may or may not be included within the 3D imaging system 120 and can be can be in communication with an occupant safety system 140 and/or an occupant warning system 150. As described above, the active ultrasonic array 110 can propagate a plurality of sound waves and receive a plurality of echo waves, the echo waves generating a plurality of electrical pulses which are transmitted to the 3D imaging system 120. The 3D imaging system 120 can receive the plurality of electrical pulses from the active ultrasonic array 110 and create/generate a 3D image.

The 3D image can be analyzed by the electronic control unit 130 and used to provide an occupant safety parameter that is transmitted to the occupant safety system 140 and/or the occupant warning system 150. In the alternative, the electronic control unit 130 does not transmit the occupant safety parameter but does transmit an instruction that is related to the occupant safety parameter to the occupant safety system 140 and/or the occupant warning system 150.

Figure 2:
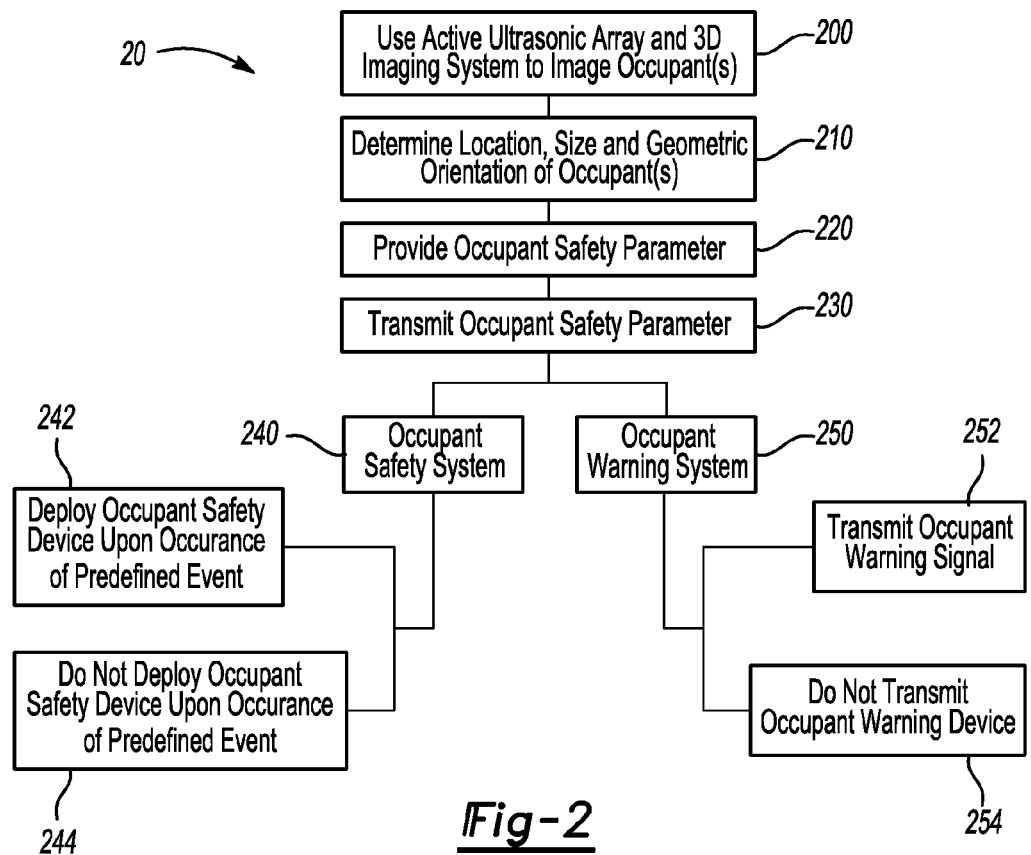
FIG. 2 is a schematic representation of a process according to an embodiment of the present invention.

Turning to FIG. 2, a process for operating an active safety system is shown generally at reference numeral 20. The process 20 can include using the active ultrasonic array and the 3D imaging system to image an occupant at step 200. Thereafter, the location, size and geometric orientation of the occupant is determined at step 210. In addition, a non-occupant object can be identified if it is located within the range of the plurality of sound waves that are propagated by the plurality of ultrasonic transducers of the active ultrasonic array. After the location, size and geometric orientation of the occupant is determined at step 210, an occupant safety parameter can be provided at step 220.

The occupant safety parameter or an instruction related to the occupant safety parameter can be transmitted at step 230 and received by the occupant safety system at step 240 and/or the occupant warning system at step 250. Based on the occupant safety parameter, or the instruction, the occupant safety system can deploy an occupant safety device upon occurrence of a predefined event at step 242 or not deploy the occupant safety device upon occurrence of the predefined event at step 244. Likewise, upon receiving the occupant safety parameter or the instruction at step 250, the occupant warning system can transmit an occupant warning signal at step 252 or not transmit an occupant warning signal at step 254.

Figure 3:
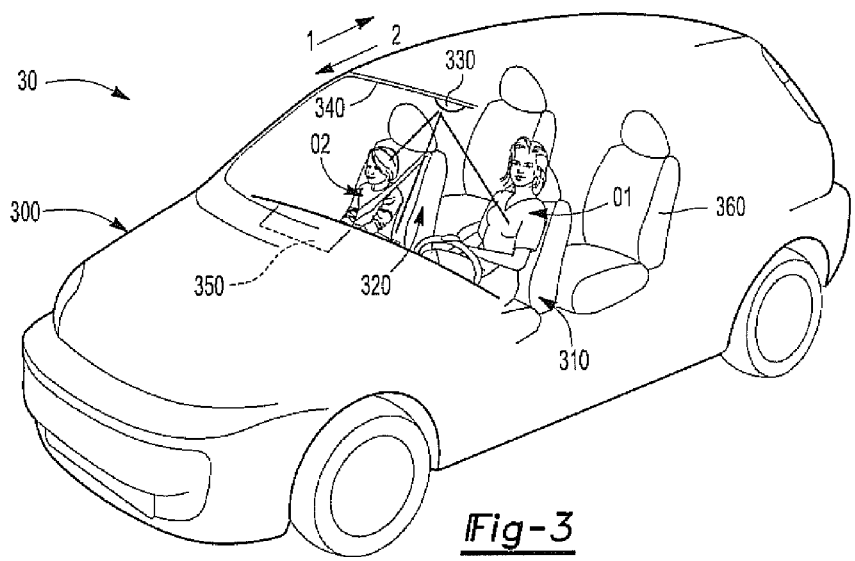
FIG. 3 is a perspective view of an active safety system as part of a motor vehicle.

A perspective view of a motor vehicle with an active safety system is shown generally at reference numeral 30 in FIG. 3. The active safety system 30 can include an active acoustic array 330 attached to a headliner 340 of a motor vehicle 300. Also included can be a smart airbag system 350 and an occupant warning system (not shown) that can be located within the headliner 340, an instrumentation panel of the motor vehicle 300, etc. It is appreciated that the motor vehicle 300 can have one or more seats, for example a driver's seat 310, a front passenger seat 320, a rear seat 360, and the like.

With the active ultrasonic array 330 attached to the headliner 340, a plurality of ultrasonic transducers within the active ultrasonic array 330 can propagate a plurality of sound waves in a direction towards the interior of the motor vehicle 300. Stated differently, the active ultrasonic array 330 is located forwardly with respect to the interior of the motor vehicle and propagates ultrasonic waves in a rearwardly direction 1. In addition, echo waves bouncing off of the interior of the motor vehicle 300 and/or an occupant O1, an occupant O2, etc. and traveling in a forwardly direction 2 can be received by the plurality of ultrasonic transducers within the active ultrasonic array 330 and subsequently generate a plurality of electrical pulses.

Also included within the active safety system can be a 3D imaging system. Upon receiving the plurality of echo waves, the active ultrasonic array 330 can generate the plurality of electrical pulses and transmit the pulses to the 3D imaging system. The 3D imaging system can receive the plurality of electrical pulses and generate a 3D image, e.g. a 3D image of occupant O1 and/or occupant O2. Thereafter, an electronic control unit can analyze the 3D image and determine a location, size and geometric orientation of the 3D image and provide an occupant safety parameter. For example and for illustrative purposes only, the electronic control unit can analyze the 3D image and determine that occupant O1 is an adult and occupant O2 is a child. In addition, the analysis of the 3D image by the electronic control unit can determine that occupant O1 is not wearing a seatbelt, occupant O2 is wearing a seatbelt and/or that both occupants O1 and O2 are facing forward.

In some instances, the active ultrasonic array 330 can include an ultra-sensitive and broadband microphone, that may or mat not be at least part of the plurality of ultrasonic transducers. The ultra-sensitive and broadband microphone can afford for detection of the heartbeat and/or breathing rate of the occupant O1, occupant O2, etc. In this manner, the electronic control unit can also determine the heartbeat rate and/or breathing rate of the occupants during driving of the vehicle, after an accident, and the like.

In the event that the occupant O1, the occupant O2, etc. is not wearing a seatbelt, is not facing forward and the like, the 3D image generated by the 3D imaging system and analyzed by the electronic control unit could result in an occupant safety parameter that could alter the deployment of an airbag within the motor vehicle 300 in the event of an accident and/or provide an occupant warning signal to one or more of the occupants.

Figure 4:
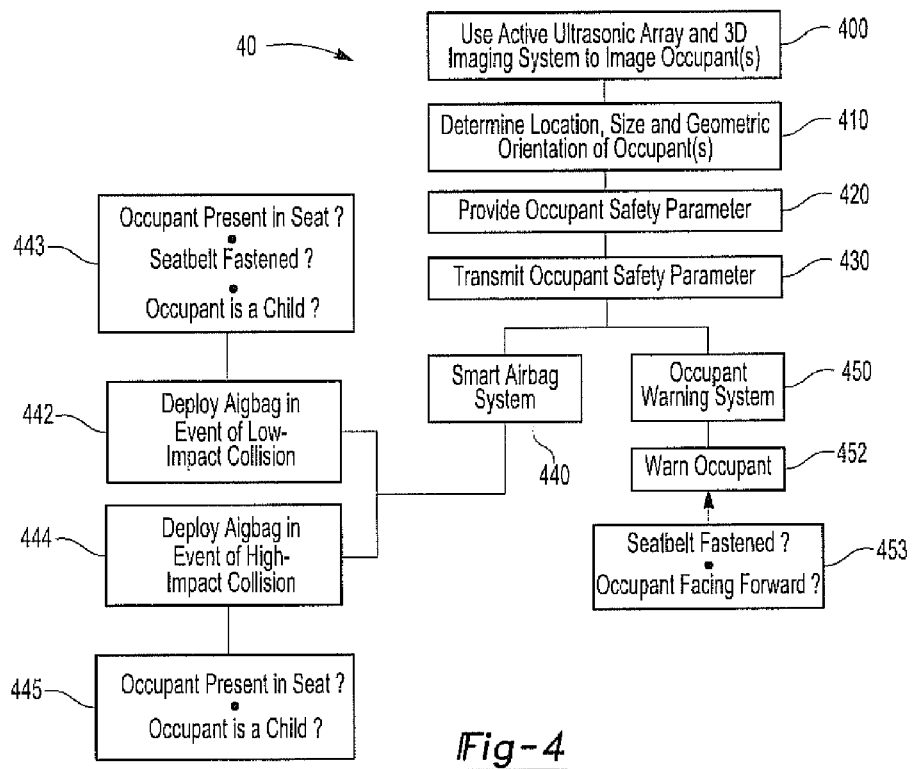
FIG. 4 is a schematic representation of a process for an active safety system in use with a motor vehicle.

Turning now to FIG. 4, an embodiment of a process for the active safety system illustrated in FIG. 3 is shown generally at reference numeral 40. The process 40 can use the active ultrasonic array and 3D imaging system to image one or more occupants within the interior of the motor vehicle at step 400. Thereafter, an electronic control unit can determine the location, size and geometric orientation of the occupants by analyzing the 3D image at step 410. Based on the location, size and geometric orientation of the occupants, the electronic control unit can provide an occupant safety parameter at step 420. In some instances, the electronic control unit will transmit the occupant safety parameter at step 430 with a smart airbag system receiving the parameter at step 440 and/or the occupant warning system receiving the parameter at step 450.

It is appreciated that the electronic control unit can transmit instructions based on the occupant safety parameter and thus not necessarily transmit the parameter itself. In any event, the smart airbag system can receive the occupant safety parameter and/or an instruction based on the occupant safety parameter, the result being the deployment of an airbag in the event of a low-impact collision at step 442 if the seat is occupied by an occupant and the seatbelt is not fastened as shown at 443. In addition, the airbag may not be deployed in the event of the low-impact collision if the seat is not occupied by an occupant, the seatbelt is fastened about an occupant, the occupant is a child and the like.

In the event of a high-impact collision, the smart airbag system can deploy an airbag as shown at step 444 if the seat is occupied by an occupant as shown at step 445. If the occupant is a child, the occupant safety parameter could instruct the smart airbag system whether or not to deploy the airbag. With respect to the occupant warning system, upon receiving the occupant safety parameter at step 450 and/or an instruction that is a function thereof, the occupant warning system can warn the occupant at step 452 if a seatbelt is not fastened, the occupant is not facing forward and the like as shown at step 453.

In this manner, the active safety system and a process of operating the active safety system as disclosed herein can afford an improved safety environment for an occupant of a motor vehicle, an operator of a machine and the like. The system uses an active ultrasonic array having a plurality of ultrasonic transducers to propagate a plurality of sound waves toward the interior of a motor vehicle, an operator position of a machine, and the like. The sound waves bounce off of any occupants that are present and physical surroundings present in the interior of the motor vehicle, the machine, etc. and return as echo waves to the plurality of ultrasonic transducers. The ultrasonic transducers convert the echo waves to electrical pulses which are transmitted by the active ultrasonic array to a 3D imaging circuit. The 3D imaging circuit can convert the plurality of electrical pulses into a 3D image. Thereafter, an electronic control unit can analyze the 3D image and determine a variety of information such as a location, size and geometric orientation of an occupant. Based on this information, the electronic control unit can generate and/or provide an occupant safety parameter that can be used to at least partially inform or control an occupant safety system and/or an occupant warning system.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. A process for operating an active safety system of a motor vehicle, the process comprising:
    providing a motor vehicle with an ultrasonic array having a plurality of ultrasonic transducers, a three-dimensional (3D) imaging system, an electronic control unit and an occupant safety system. energizing the ultrasonic array such that a plurality of sound waves are propagated and a plurality of echo waves are received by the plurality of ultrasonic transducers, the plurality of echo waves transformed into a plurality of electrical pulses by the plurality of ultrasonic transducers;
    providing an occupant warning system operable to transmit an occupant warning signal to an occupant of the motor vehicle;
    generating a 3D image from the plurality of electrical pulses with the 3D imaging system;
    determining a location, size and geometric orientation of the 3D image relative to the motor vehicle with the electronic control unit;
    providing an occupant safety parameter as a function of the location, size and geometric orientation of the 3D image;
    transmitting of the occupant safety parameter to the occupant warning system by the electronic control unit;
    receiving of the occupant safety parameter by the occupant warning system;
    determining whether or not to transmit the occupant warning signal to the occupant of the motor vehicle as a function of the occupant safety parameter, wherein the occupant warning system provides a warning to sit facing forward based on the occupant safety parameter; and
    determining whether or not to deploy an occupant safety device as a function of the occupant safety parameter.

2. The process of claim 1, wherein the ultrasonic array is attached to a headliner of the motor vehicle.

3. The process of claim 1, wherein the occupant safety parameter is selected from the group consisting of seat unoccupied, seat occupied by adult occupant, seat occupant by child occupant, seatbelt is fastened about adult occupant, seatbelt is fastened about child occupant, seat occupied by non-occupant object, occupant facing forward, and combinations thereof.

4. The process of claim 1, wherein the occupant safety system is a smart airbag system.

5. The process of claim 4, wherein the smart airbag system determines whether or not to deploy an airbag for a predefined low-level impact to the motor vehicle based on the occupant safety parameter.

6. The process of claim 4, wherein the smart airbag system determines whether or not to deploy an airbag for a predefined high-level impact based on the occupant safety parameter.

7. The process of claim 1, wherein the occupant warning system provides a warning to buckle a seatbelt based on the occupant safety parameter.

8. The process of claim 1, wherein the 3D imaging system recognizes a non-occupant object located on a seat.

9. The process of claim 8, wherein the smart airbag system does not deploy an airbag during a predefined level of impact to the motor vehicle when the non-occupant object is recognized on the seat.

10. The process of claim 8, wherein the occupant warning system does not provide a warning to sit facing forward when the non-occupant object is recognized on the seat.

11. The process of claim 8, wherein the occupant warning system does not provide a warning to buckle a seatbelt when the non-occupant object is recognized on the seat.

* * * * *